United States Patent
Yamauchi et al.

(10) Patent No.: US 11,289,868 B2
(45) Date of Patent: Mar. 29, 2022

(54) PROTECTOR

(71) Applicant: Yazaki Corporation, Tokyo (JP)

(72) Inventors: Akinori Yamauchi, Aichi (JP); Mikiya Matsuoka, Aichi (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/030,907

(22) Filed: Sep. 24, 2020

(65) Prior Publication Data

US 2021/0098956 A1 Apr. 1, 2021

(30) Foreign Application Priority Data

Sep. 27, 2019 (JP) .............................. JP2019-176528

(51) Int. Cl.
*H01R 43/20* (2006.01)
*H01R 11/11* (2006.01)

(52) U.S. Cl.
CPC ............. *H01R 43/20* (2013.01); *H01R 11/11* (2013.01); *H01R 2201/26* (2013.01)

(58) Field of Classification Search
CPC ...... H01R 43/20; H01R 11/11; H01R 2201/26
USPC .......................................................... 439/750
See application file for complete search history.

(56) References Cited

U.S. PATENT DOCUMENTS

| | | | | |
|---|---|---|---|---|
| 5,556,059 A | * | 9/1996 | Maeda | B60R 16/0215 174/69 |
| 5,615,080 A | * | 3/1997 | Nishitani | B60R 16/0215 307/10.1 |
| 5,630,728 A | * | 5/1997 | Watters, Jr. | H01R 13/60 439/528 |
| 5,856,908 A | * | 1/1999 | Takiguchi | B60R 16/0215 361/690 |
| 6,250,706 B1 | * | 6/2001 | Davis, Jr. | B60K 37/00 296/70 |
| 6,257,897 B1 | * | 7/2001 | Kubota | B60H 1/00557 439/34 |
| 6,621,688 B1 | * | 9/2003 | Burdick | B60R 16/0207 174/72 A |
| 6,633,089 B2 | * | 10/2003 | Kimura | B60R 16/0215 174/72 A |
| 10,312,642 B2 | * | 6/2019 | Namiki | H01R 13/74 |

(Continued)

FOREIGN PATENT DOCUMENTS

| JP | 2012-101584 A | 5/2012 |
|---|---|---|
| JP | 2015-177596 A | 10/2015 |

(Continued)

*Primary Examiner* — Alexander Gilman
(74) *Attorney, Agent, or Firm* — Sughrue Mion, PLLC (57) ABSTRACT

A protector includes a protector body to hold a wire member and a temporary holding unit to temporarily hold a connector provided to an end of the wire member. The temporary holding unit includes a first holding part engageable with the first portion of the flange of the connector, and a second holding part located remote from the first holding part and engageable with the second portion of the flange of the connector. With the temporary holding unit temporarily holding the connector, the first holding part and the second holding part are located in an area where the temporary holding unit and the flange overlap one over the other, when viewed from an insertion direction.

8 Claims, 7 Drawing Sheets

(56) References Cited

U.S. PATENT DOCUMENTS

| | | | |
|---|---|---|---|
| 2012/0101584 A1* | 4/2012 | Amirouche | A61F 2/3877 623/20.2 |
| 2015/0177596 A1* | 6/2015 | Bergsten | F16M 13/022 248/205.1 |
| 2015/0294768 A1* | 10/2015 | Sakaki | H01B 13/01209 174/68.3 |
| 2018/0351283 A1* | 12/2018 | Fisher | H01R 13/502 |

FOREIGN PATENT DOCUMENTS

| | | | |
|---|---|---|---|
| WO | 2013001666 A1 | 1/2013 | |
| WO | 2014069354 A1 | 5/2014 | |

* cited by examiner

PROTECTOR

CROSS-REFERENCE TO RELATED APPLICATION(S)

The present application claims priority to and incorporates by reference the entire contents of Japanese Patent Application No. 2019-176528 filed in Japan on Sep. 27, 2019.

BACKGROUND OF THE INVENTION

1. Field of the Invention

The present invention relates to a protector.

2. Description of the Related Art

Vehicles including cars use a wire harness for connection between devices mounted on the vehicle. Some wire harnesses have a protector that protects the wire members of the wire harness from outside influence. The protector is fixed to the vehicle body.

The wire member of the wire harness may have a connector at an end thereof, and the connector is connected to a counterpart connector of a device on the vehicle. In the process, an operator fixes the protector to the vehicle body, installs the target device to the inside of the body, and then connects the connector with the counterpart connector. The step of connecting the connector with the counterpart connector is situated at the end part of the process flow. With the connector, provided to the end of the wire member, not in connection with the counterpart connector, the installation operation may sometimes be interrupted by the unconnected connector. The connector is therefore temporarily held not to interrupt the installation operation (for example, see Japanese Patent Application Laid-open No. 2012-101584 and Japanese Patent Application Laid-open No. 2015-177596).

Conventional wire harnesses can be improved to make its temporary hold on the connector more stable.

SUMMARY OF THE INVENTION

From this viewpoint, it is an object of the present invention to provide a protector that allows its temporary hold on a connector to be more stable.

In order to achieve the above mentioned object, a protector according to one aspect of the present invention includes a protector body that holds a wire member; and a temporary holding unit that temporarily holds a connector provided to an end of the wire member, wherein the temporary holding unit includes a first holding part engageable with a first portion of a flange of the connector and a second holding part located remote from the first holding part and engageable with a second portion of the flange of the connector, and with the temporary holding unit temporarily holding the connector, the first holding part and the second holding part are located in an area in which the temporary holding unit and the flange overlap one over another, when viewed from an insertion direction.

According to another aspect of the present invention, in the protector, it is preferable that the protector body has a routing space inside the body in which the wire member is routed, and the temporary holding unit is integrally formed with the protector body in a manner projecting outside the protector body.

According to still another aspect of the present invention, in the protector, it is preferable that the temporary holding unit has a first surface and a second surface intersecting with the insertion direction, the first holding part has a protector columnar portion extending from the first surface along a removal direction, the removal direction being a direction opposite to the insertion direction, the second holding part has a protector hole extending from the second surface along the insertion direction, and the temporary holding unit temporarily holds the connector by moving the connector in the insertion direction relative to the temporary holding unit, and causing the protector columnar portion to be inserted in a connector hole that is the first portion, and causing a connector columnar portion that is the second portion to be inserted in the protector hole.

According to still another aspect of the present invention, in the protector, it is preferable that the second surface is located close to the insertion direction relative to the first surface, a front end surface of the connector columnar portion is located close to the insertion direction relative to an end surface of the flange, and with the connector temporarily held by the temporary holding unit, the end surface is in contact with the first surface in the insertion direction.

According to still another aspect of the present invention, in the protector, it is preferable that a length from the second surface to a front end surface of the protector columnar portion in the removal direction is equal to a length from the end surface of the flange to a front end surface of the connector columnar portion in the insertion direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will now be described in detail with reference to the drawings. It should be noted that the embodiments are not intended to limit the present invention. Components described in the following embodiments include components that could be easily replaced by the skilled person or components that are substantially the same.

Embodiments

Figure 1:
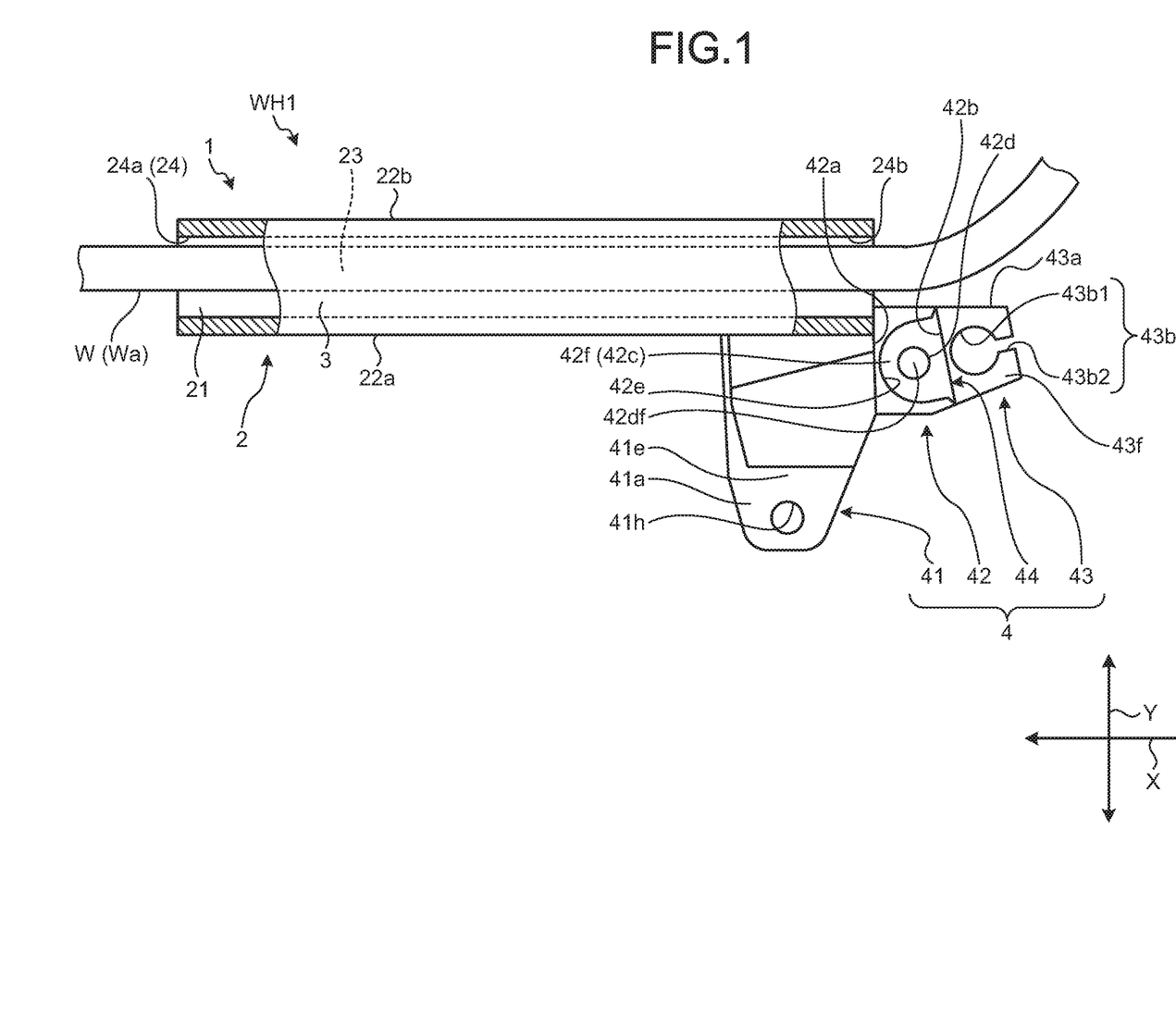
FIG. 1 is a plan view of a protector according to an embodiment.
Figure 2:
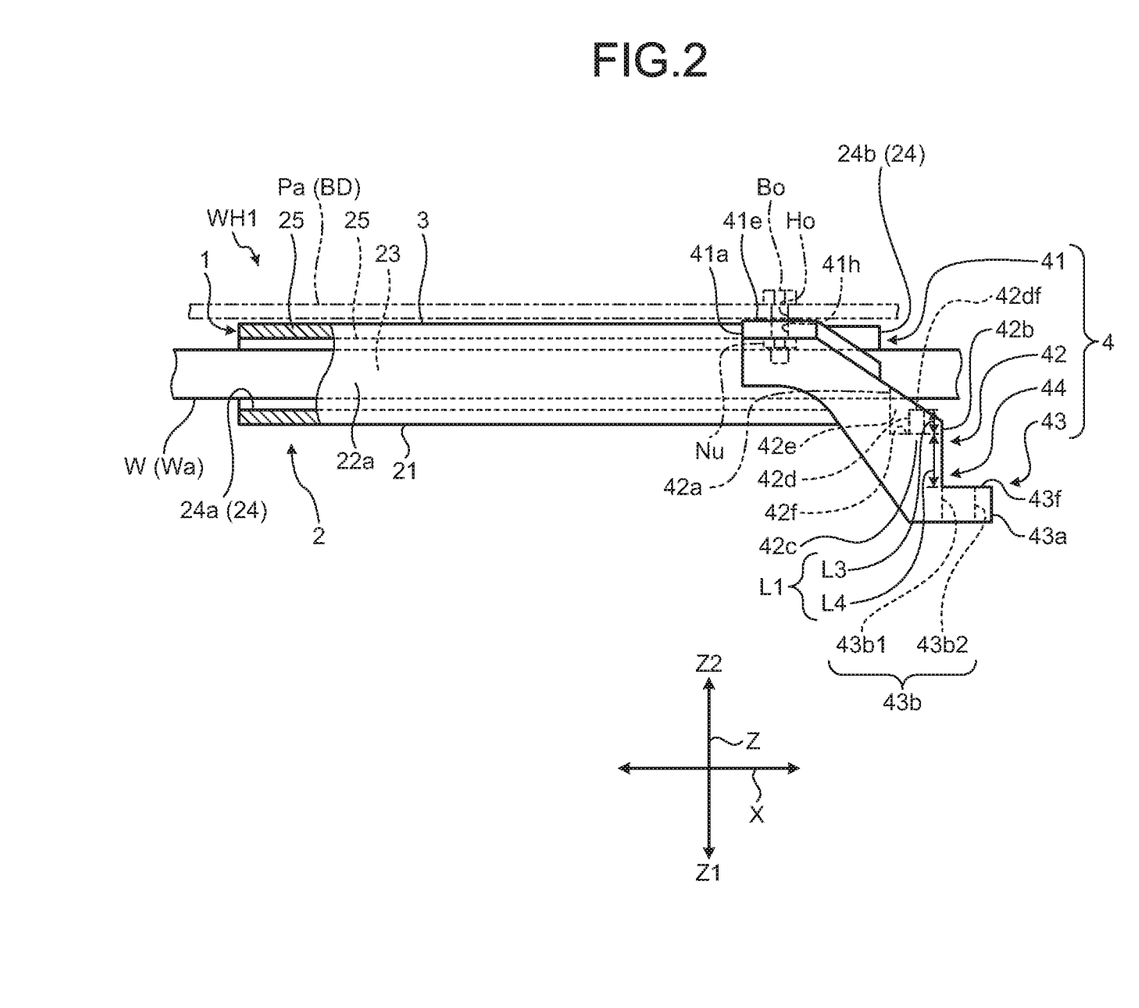
FIG. 2 is a side view of a temporary holding unit of the protector.
Figure 3:
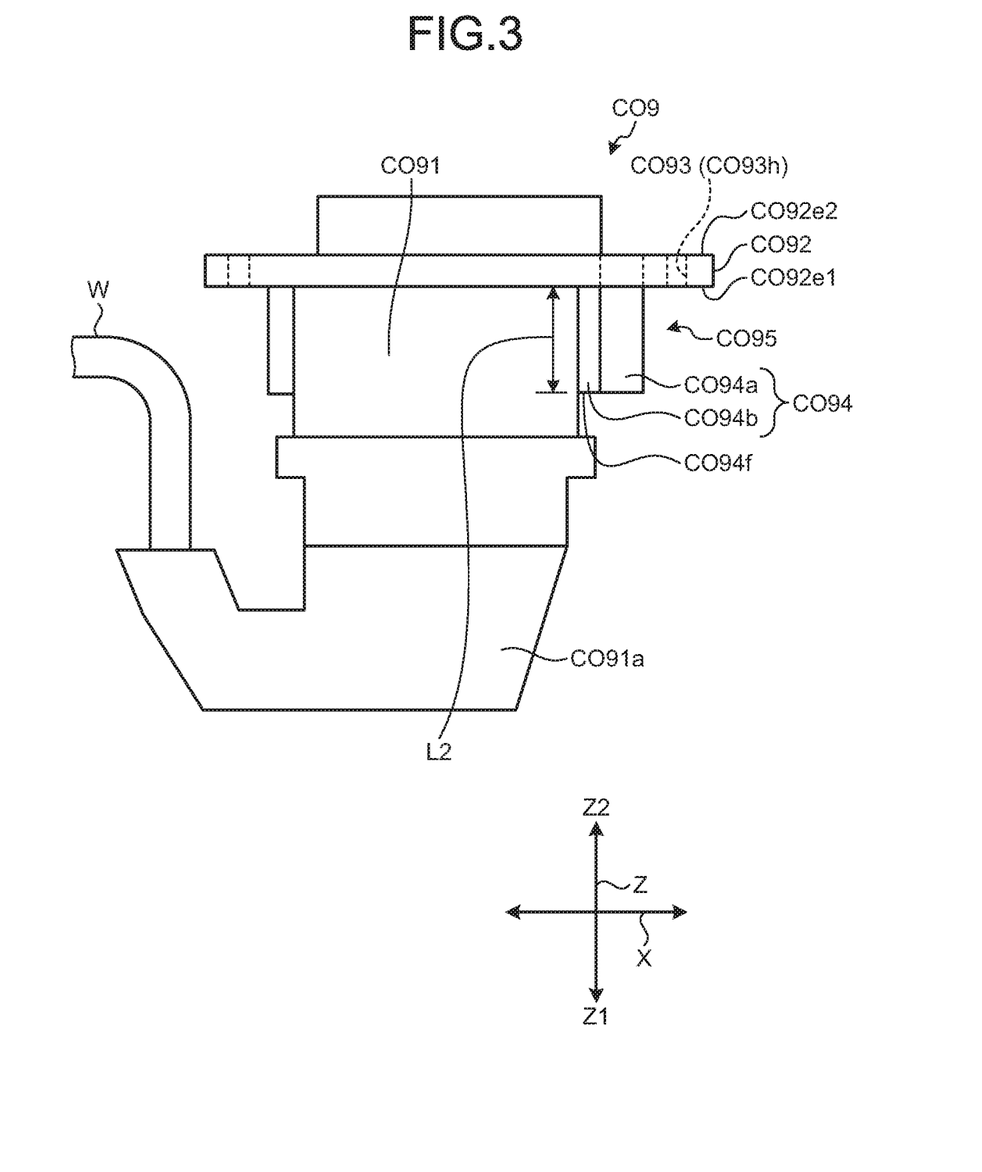
FIG. 3 is a side view of a connector temporarily held by the protector according to the embodiment.
Figure 4:
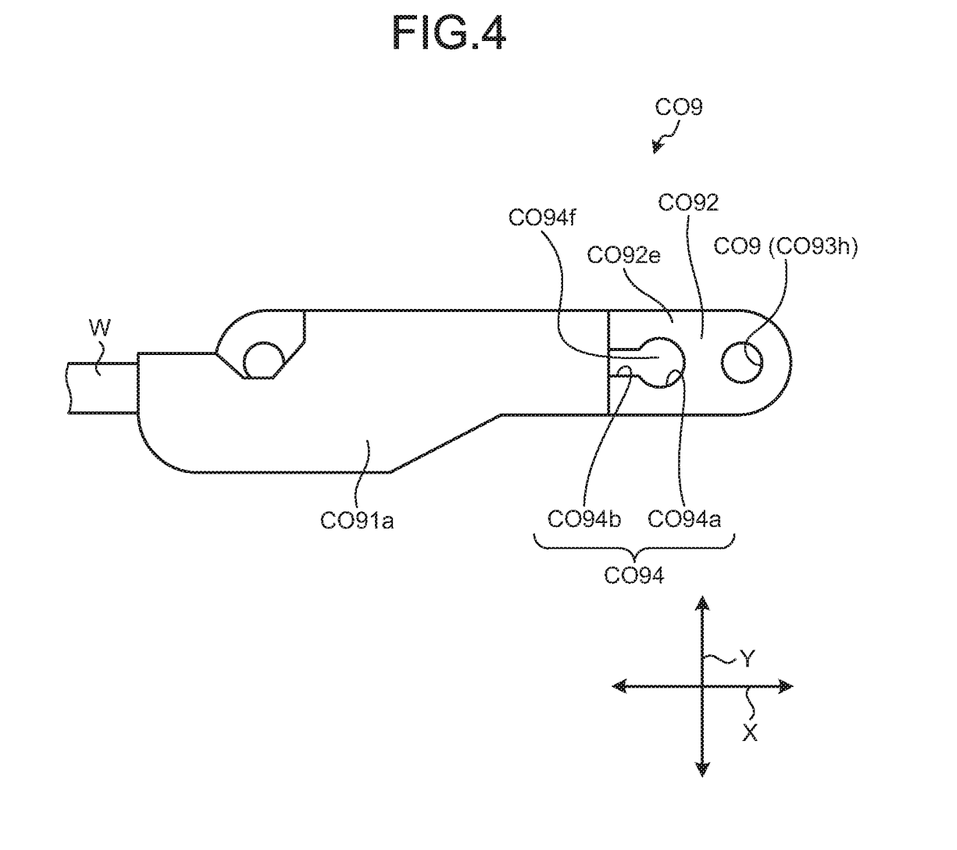
FIG. 4 is a bottom view of the connector.
Figure 5:
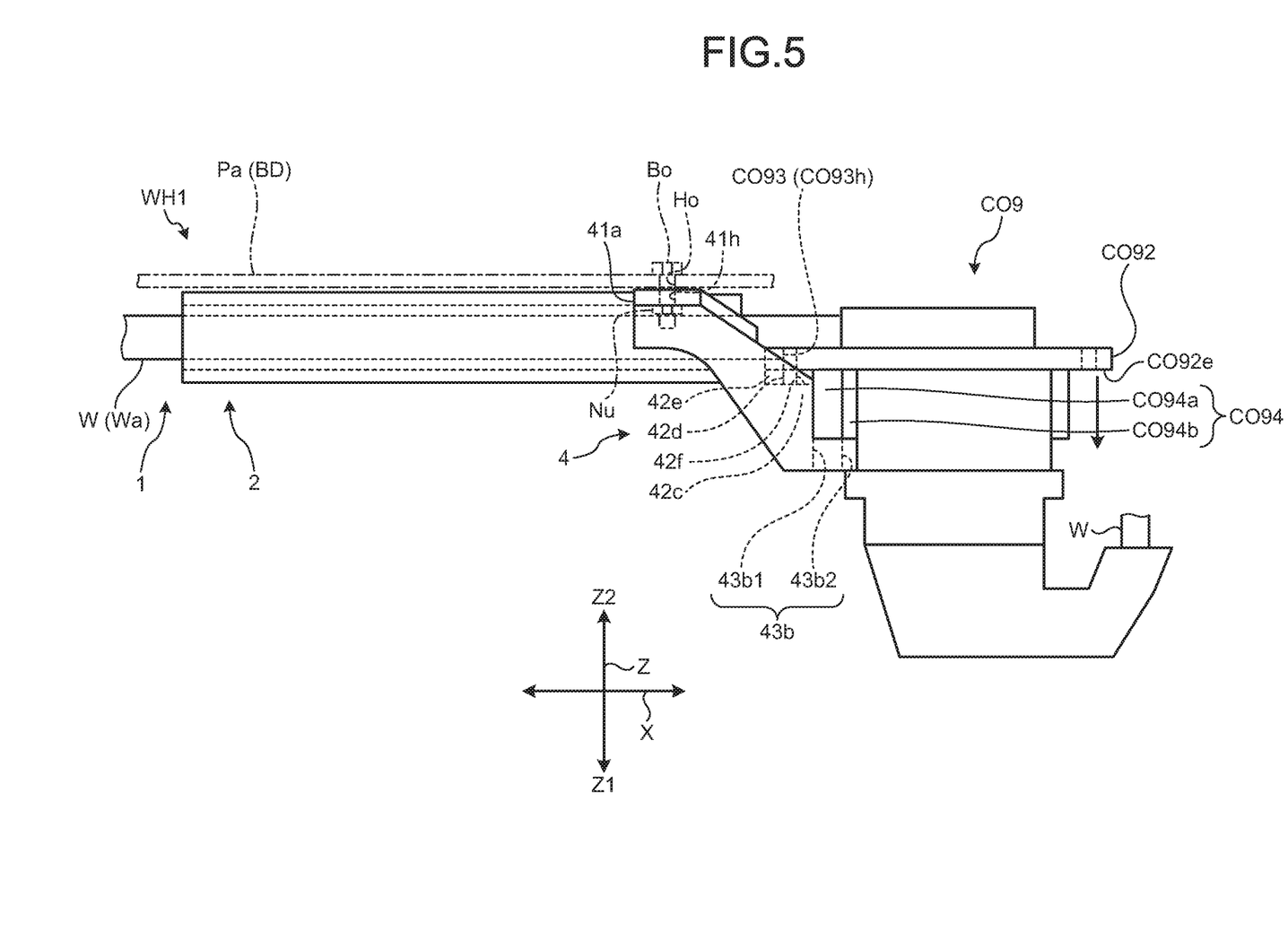
FIG. 5 is a side view of the protector, viewed from the side thereof, during operation of temporary hold on the connector using a temporary holding unit of the protector.
Figure 6:
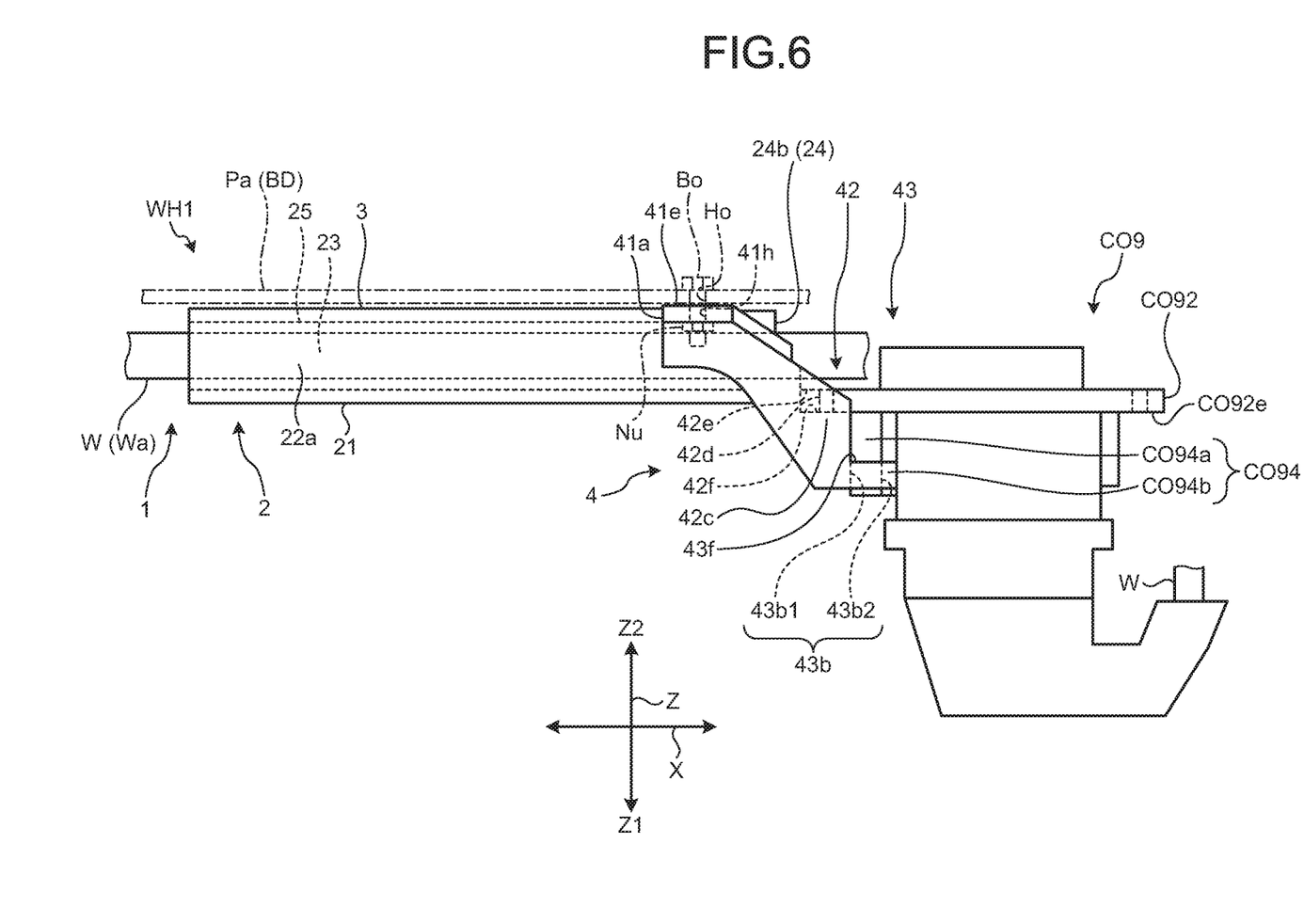
FIG. 6 is a side view of the protector temporarily holding the connector with the temporary holding unit thereof.
Figure 7:
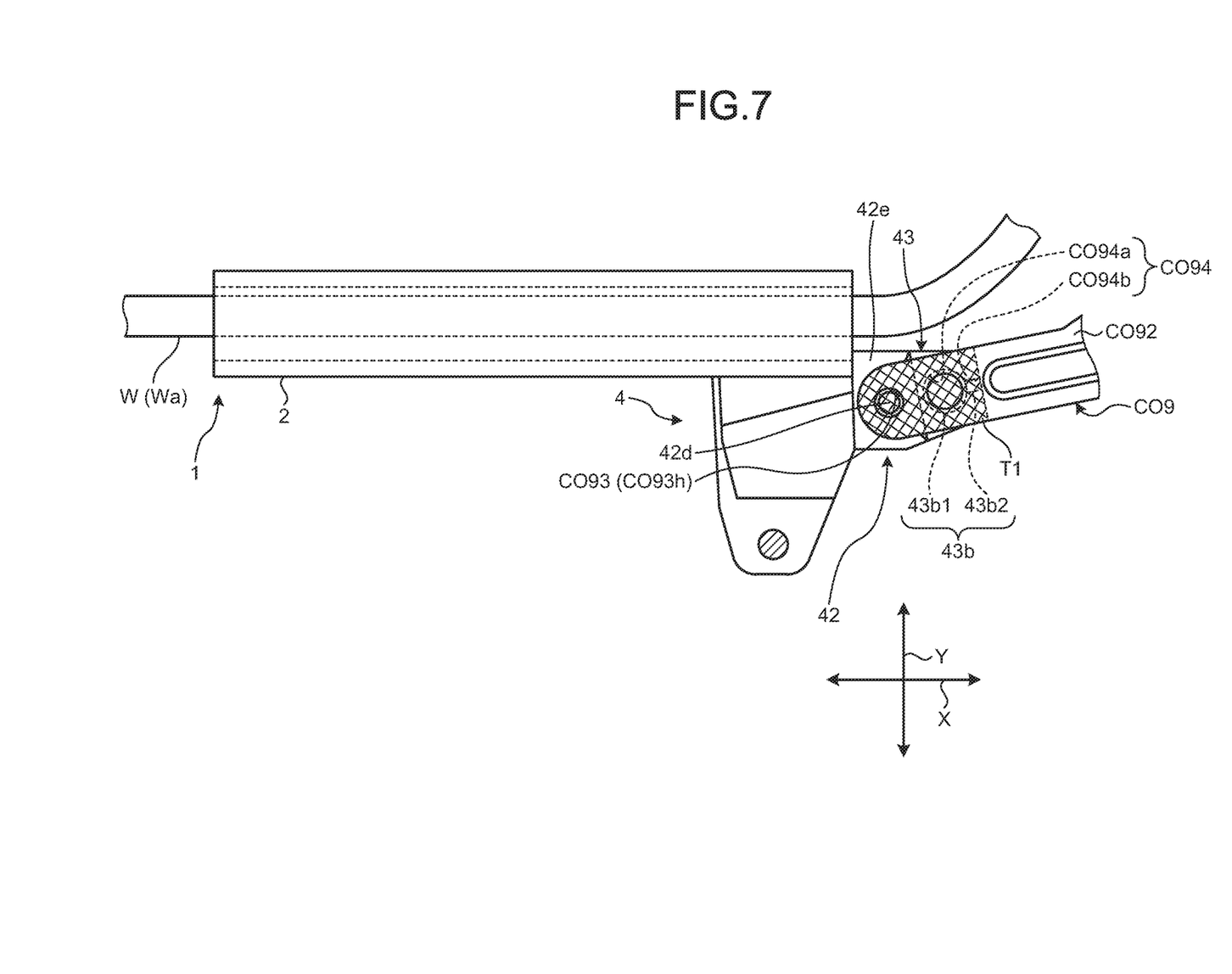
FIG. 7 is a plan view of the protector temporarily holding the connector with the temporary holding unit thereof.

A protector 1 according to an embodiment will now be described in detail. FIG. 1 is a plan view of the protector 1 according to the embodiment. FIG. 2 is a side view of a temporary holding unit of the protector. FIG. 3 is a side view of a connector CO9 temporarily held by the protector 1 according to the embodiment. FIG. 4 is a bottom view of the connector CO9. FIG. 5 is a side view of the protector, viewed from the side thereof, during operation of temporary hold on the connector using a temporary holding unit of the protector. FIG. 6 is a side view of the protector temporarily holding the connector with the temporary holding unit thereof. FIG. 7 is a plan view of the protector temporarily holding the connector with the temporary holding unit thereof. In the following description, of a first direction, a second direction, and a third direction intersecting with one another, the first direction will be referred to as an "axial direction X", the second direction will be referred to as a "width direction Y", and the third direction will be referred to as a "height direction Z (the vertical direction)". The axial direction X, the width direction Y, and the height direction Z of the protector 1 of the embodiment are orthogonal to (intersect with) one another. The axial direction X is a direction in which an electrical wire Wa as a wire member W extends inside a protector body 2. The width direction Y is a direction in which a pair of side walls 22a and 22b of the protector body 2 face each other. The height direction Z is a direction along which the protector body 2 and a lid member 3 are stacked one over the other, which is, for example, the vertical direction. A side of the height direction Z serves as an insertion direction Z1 along which the connector CO9 is inserted into the protector body 2 to be temporarily held by the protector body 2. The direction is, for example, the downward direction. The other side of the height direction Z serves as a removal direction Z2 along which the connector CO9 temporarily held by the protector body 2 is removed therefrom. The direction is, for example, the upward direction.

The protector 1 of the embodiment illustrated in FIG. 1 and FIG. 2 is assembled to a wire harness WH1 that is mounted on a vehicle, such as a car, and is put on a conductive wire member W to protect the wire member W. The wire harness WH1 is an assembly of bundled wire members W used for power supply and signal communications, and connects devices mounted on a vehicle with one another. The wire harness WH1 connects the wire members W to the devices through the connectors CO9 (see FIG. 3 and FIG. 4) or similar parts. The wire harness WH1 includes the conductive wire member W, the protector 1 put on the wire member W to protect the wire member W, and the connector CO9 provided to an end of the wire member W. The wire member W is, for example, an electrical wire Wa. The electrical wire Wa has its conductive body (the core), made of a plurality of metal conductors, exteriorly covered by an insulating covering member. The wire harness WH may further include an electrical junction box, a grommet, a fixture, and other components. The configuration of the protector 1 will now be described in detail with reference to the drawings.

The protector 1 is, for example, a substantially rectangular tube made of insulating resin. Although the wire member W protected by the protector 1 of the embodiment is routed linearly, the manner is not limited thereto. The wire member W may be routed while bent in L-shape or the like. The protector 1 includes the protector body 2, the lid member 3, a fastening mechanism (not illustrated) to fasten the lid member 3 to the protector body 2, and a temporary holding unit 4. In the protector 1 of the embodiment, the protector body 2 and the lid member 3 are separately formed, and the lid member 3 is fastened to the protector body 2 by the fastening mechanism.

The protector body 2 protects the wire member W routed inside the protector body 2. The protector body 2 of the embodiment is formed in a gutter shape with both ends in the axial direction X and an end in the height direction Z (the top end in the vertical direction) open. The protector body 2, for example, accommodates therein the wire member W routed along the axial direction X.

The protector body 2 includes a base 21 and a pair of side walls 22a and 22b. The protector body 2 further includes a routing space 23, an insertion aperture 24, and a closable aperture 25, which are defined by the base 21 and the pair of side walls 22a and 22b.

The base 21 is a bottom wall that defines the routing space 23 and is located at an end (the bottom end in the vertical direction) in the height direction Z. The base 21 has a certain width slightly larger than the diameter of the wire member W in the width direction Y and extends in the axial direction X.

The pair of side walls 22a and 22b define the routing space 23 and are located at respective ends in the width direction Y. Each of the side walls 22a and 22b has a certain height slightly larger than the diameter of the wire member W in the height direction Z and projects from the base 21 in the height direction Z. The side walls 22a and 22b are located at respective sides of the base 21 in the width direction Y and face each other with a gap interposed therebetween in the width direction Y.

The routing space 23 is a space inside the protector body 2, and the wire member W is routed in the routing space 23 along the axial direction X. In other words, the protector body 2 has the routing space 23 inside thereof where the wire member W is routed. The routing space 23 is an inner space surrounded by the base 21 and the pair of side walls 22a and 22b.

The insertion aperture 24 is an aperture through which the wire member W is routed in the routing space 23. The insertion aperture 24 includes a first insertion aperture 24a and a second insertion aperture 24b defined by the base 21 and the pair of side walls 22a and 22b at respective ends of the protector body 2 in the axial direction X. The first insertion aperture 24a and the second insertion aperture 24b are open in the width direction Y and the height direction Z.

The closable aperture 25 is an aperture through which the routing space 23 is exposed outside. The closable aperture 25 is closed by the lid member 3. The closable aperture 25 is, for example, opened when the wire member W is inserted into the routing space 23 and closed by the lid member 3 after the wire member W is placed in the routing space 23. The closable aperture 25 is located at ends (the top ends in the vertical direction) of the pair of side walls 22a and 22b in the height direction Z and is defined by the ends of the side walls 22a and 22b opposite to the base 21.

The lid member 3 is a ceiling wall assembled to the protector body 2 to cover (close) the closable aperture 25 formed on the protector body 2 and defines the routing space 23. The lid member 3 is located at ends (the top ends in the vertical direction) of the pair of side walls 22a and 22b in the height direction Z. The lid member 3 is a rectangular plate the shape of which corresponds to the protector body 2. The lid member 3 of the embodiment has a certain width slightly larger than the diameter of the wire member W in the width direction Y and extends in the axial direction X.

The connector CO9 illustrated in FIG. 3 and FIG. 4 includes a connector body CO91 in the shape of a substantially oval column and a flange CO92 projecting outward from the peripheral surface of the connector body CO91. The connector body CO91 has a connection portion CO91a and is connected with the wire member W through the connection portion CO91a. The flange CO92 has a first end surface (end surface) CO92e1 facing the insertion direction Z1, a second end surface CO92e2 facing the removal direction Z2, and a later-described first portion CO93 and second portion CO94. With the second end surface CO92e2 of the flange CO92 in contact with a facing end surface of a counterpart flange, the flange CO92 is connected with the counterpart flange using fastening members, a bolt and a nut, to electrically connect the wire member W with the target device.

The first portion CO93 is a connector hole CO93h extending from the first end surface CO92e1 of the flange CO92 in the removal direction Z2. In other words, the connector hole CO93h penetrates through the flange CO92 from the first end surface CO92e1 in the removal direction Z2. The connector hole CO93h is a through-hole through which the above-described bolt passes, and is formed at least on an end of the flange CO92 in the axial direction X.

The second portion CO94 is a connector columnar portion extending from the first end surface CO92e1 of the flange CO92 in the insertion direction Z1. The second portion CO94 of the embodiment is formed on either one of ends of the flange CO92 in the axial direction X, and is located next to one of the connector holes CO93h. The second portion CO94 has, for example, a first columnar portion CO94a in a cylindrical shape and a second columnar portion CO94b in a plate-like shape. The first columnar portion CO94a is provided next to the connector hole CO93h. For connection of the flange CO92 and a counterpart flange, a protruding portion of the above-described device is inserted to the inner peripheral surface of the cylindrical first columnar portion CO94a. The second columnar portion CO94b is adjacent to the connector body CO91 and is in continuous connection with the first columnar portion CO94a in the axial direction X. The first columnar portion CO94a has the length in the width direction Y, intersecting with the insertion direction Z1, larger than the length in the width direction Y, intersecting with the insertion direction Z1, of the second columnar portion CO94b. The connector CO9 further has a connector step portion CO95 between the first end surface CO92e1 and a front end surface CO94f of the connector columnar portion (the second portion CO94) of the flange CO92 in the insertion direction Z1. In other words, the front end surface CO94f of the connector columnar portion (the second portion CO94) is located on a side of the flange CO92 having the first end surface CO92e1 in the insertion direction Z1. The length from the first end surface CO92e1 of the flange CO92 to the front end surface CO94f of the connector columnar portion, or the second portion CO94, in the insertion direction Z1 is given as L2.

The temporary holding unit 4 of the protector 1 illustrated in FIG. 1 and FIG. 2 is used to temporarily hold the connector CO9 provided to an end of the wire member W. For example, when a device such as a rear motor is installed to a vehicle body BD after the protector 1 is mounted on the vehicle body BD, the protector 1 causes the temporary holding unit 4 to temporarily hold the connector CO9 with the intention to keep the connector CO9 from interfering with the installation operation of the device. The temporary holding unit 4 is integrally formed with the protector body 2. More specifically, the temporary holding unit 4 is integrally formed with the protector body 2 in a fashion that projects outside the protector body 2. The temporary holding unit 4 includes a temporary holding unit body 41, a first holding part 42, a second holding part 43 located remote from the first holding part 42, and a protector step portion 44. In the temporary holding unit 4 of the embodiment, the temporary holding unit body 41, the first holding part 42, and the second holding part 43 are arranged along the axial direction X, and the first holding part 42 and the second holding part 43 project from the protector body 2 in the insertion direction Z1. The temporary holding unit 4 further has a first surface 42f and a second surface 43f intersecting with (perpendicular to) the insertion direction Z1.

The temporary holding unit body 41 is formed, for example, as a plate continuously connected to the side wall 22a of the pair of side walls 22a and 22b of the protector body 2, and horizontally (in the axial direction X and in the width direction Y) extending. The temporary holding unit body 41 of the embodiment is disposed at the other end of the protector body 2 in the axial direction X. The other end of the temporary holding unit body 41 in the axial direction X is aligned with the other ends of the side walls 22a and 22b of the protector body 2. The temporary holding unit body 41 has a fixing portion 41a at a front end thereof in the width direction Y. The fixing portion 41a is used to fix the protector 1 including the temporary holding unit 4 to the vehicle body BD. The fixing portion 41a is formed in the temporary holding unit 4 with an end (the top end in the vertical direction) 41e in the height direction Z projecting higher than an end (the top end in the vertical direction) of the lid member 3 in the height direction Z. The fixing portion 41a has a bolt screw hole 41h through which a thread portion of a bolt Bo is screwed. The bolt screw hole 41h formed in the fixing portion 41a is open toward the insertion direction Z1 from the end (the top end in the vertical direction) 41e in the height direction Z. In other words, the bolt screw hole 41h penetrates the fixing portion 41a from the end (the top end in the vertical direction) 41e in the height direction Z. The protector 1 is fixed to a panel Pa of the vehicle body BD by having the thread portion of the bolt Bo screwed into the bolt screw hole 41h and a panel through-hole Ho of the panel Pa and having a nut Nu mating with the thread portion of the bolt Bo. The protector 1 is, for example, fixed to the vehicle body BD with the bolt Bo and the nut Nu while exposed outside the vehicle body BD.

The first holding part 42 is adjacent to the temporary holding unit body 41 in the axial direction X and extends in the axial direction X from an end of the temporary holding unit body 41 in the axial direction X, and is slanted with respect to the insertion direction Z1. More specifically, the first holding part 42 extends from the temporary holding unit body 41 toward a side in the axial direction X having no side walls 22a or 22b of the protector body 2. The first holding part 42 is slanted with respect to the insertion direction Z1 such that an adjacent portion 42a adjacent to the temporary holding unit body 41 is positioned at the level of an end (the top end of the first holding part 42 in the vertical direction) in the height direction Z and that a remote portion 42b, remote from the temporary holding unit body 41, is positioned at the level of the other end (the bottom end of the first holding part 42 in the vertical direction) in the height direction Z. The first holding part 42 has a first base portion 42c, a protector columnar portion 42d, and a holding-part side wall portion 42e. The first base portion 42c is in the shape of a rectangular prism and has the first surface 42f at an end (the top end in the vertical direction) thereof in the removal direction Z2. The protector columnar portion 42d is in the shape of a column projecting in the removal direction Z2 from the first surface 42f and extending along the removal direction Z2. The protector columnar portion 42*d* is designed to be disposed in the first portion CO93, or the connector hole CO93*h*, formed on the flange CO92 of the connector CO9. In other words, the first holding part 42 is engageable with the first portion CO93 of the flange CO92 of the connector CO9. The protector columnar portion 42*d* projects from the first surface 42*f* in the removal direction Z2 by a length L3. The holding-part side wall portion 42*e* is a tubular portion that covers the outer peripheral surface of the protector columnar portion 42*d* in the width direction Y intersecting with the insertion direction Z1. More specifically, the holding-part side wall portion 42*e* is facingly disposed around the outer peripheral surface of the protector columnar portion 42*d* with a certain gap therebetween. In the protector 1 according the embodiment, when the temporary holding unit 4 temporarily holds the connector CO9, the flange CO92 is held between the outer peripheral surface of the protector columnar portion 42*d* and the inner peripheral surface of the holding-part side wall portion 42*e* (see FIG. 7).

The second holding part 43 is adjacent to the first holding part 42 in the axial direction X and extends in the axial direction X from the other end of the first holding part 42 in the axial direction X. More specifically, the second holding part 43 extends in the axial direction X, that is, in a direction remote from the protector body 2. The second holding part 43 has a second base portion 43*a* and a protector hole 43*b*. The second base portion 43*a* is a flat plate having the second surface 43*f* at an end (the top end in the vertical direction) in the removal direction Z2. The protector hole 43*b* is formed in the second base portion 43*a* and extends from the second surface 43*f* along the insertion direction Z1. More specifically, the protector hole 43*b* extends from the second surface 43*f* along the insertion direction Z1 and penetrates the second base portion 43*a* in the insertion direction Z1. The protector hole 43*b* consists of a first hole 43*b*1 and a second hole 43*b*2. The first hole 43*b*1 is in the proximity of the first holding part 42, and the second hole 43*b*2 is located remote from the first holding part 42. The first hole 43*b*1 has a length in the width direction Y larger than the length of the second hole 43*b*2 in the width direction Y. The first hole 43*b*1 is formed in the second base portion 43*a* and designed to receive the first columnar portion CO94*a*. The second hole 43*b*2 is formed in the second base portion 43*a* and is in continuous connection with the first hole 43*b*1 and is designed to receive the second columnar portion CO94*b*. The second holding part 43 is located separately from the first holding part 42 and is engageable with the second portion CO94 of the connector CO9.

The temporary holding unit 4 has the protector step portion 44 between the first holding part 42 and the second holding part 43 in the insertion direction Z1. The second surface 43*f* is located close to the insertion direction Z1 relative to the first surface 42*f*. The length from the second surface 43*f* to the first surface 42*f* in the removal direction Z2 is given as L4.

The length L1, illustrated in FIG. 2, from the second surface 43*f* to a front end surface 42*df* of the protector columnar portion 42*d* in the removal direction Z2 is equal to the length L2 from the first end surface CO92*e*1 to the front end surface CO94*f* of the second portion CO94, or the connector columnar portion, of the flange CO92 in the insertion direction Z1 (see FIG. 3).

The wire harness WH configured as above is installed to the vehicle body BD by an operator. In this process, the panel through-hole Ho penetrating, in the height direction Z, the panel Pa of the vehicle body BD illustrated in FIG. 5 is aligned with the bolt screw hole 41*h* of the fixing portion 41*a*. The thread portion of the bolt Bo is screwed into the above-described panel through-hole Ho and the bolt screw hole 41*h*, and mates with the nut Nu. In this manner, the protector 1 is installed to the vehicle body BD.

As described below, the connector CO9 is temporarily held by the temporary holding unit 4. The connector CO9 is horizontally moved such that the flange CO92 and the temporary holding unit 4 overlap with each other in the insertion direction Z1. The connector CO9 is then moved in the insertion direction Z1 relative to the temporary holding unit 4, as indicated by the arrow of FIG. 5. This process causes the protector columnar portion 42*d* to be inserted in the connector hole CO93*h*, or the first portion CO93, and causes the connector columnar portion, or the second portion CO94, to be inserted in the protector hole 43*b*, whereby the connector CO9 is temporarily held by the temporary holding unit 4, as illustrated in FIG. 6. More specifically, moving the connector CO9 in the insertion direction Z1 relative to the temporary holding unit 4 causes the first columnar portion CO94*a* to be disposed in the first hole 43*b*1 of the protector hole 43*b* and causes the second columnar portion CO94*b* to be disposed in the second hole 43*b*2 of the protector hole 43*b*. With the connector CO9 temporarily held by the temporary holding unit 4, the first end surface CO92*e*1 of the flange CO92 is in contact with the first surface 42*f* in the insertion direction Z1. When viewed with the connector CO9 temporarily held by the temporary holding unit 4 from the insertion direction Z1, as illustrated in FIG. 7, the first holding part 42 and the second holding part 43 are located in an area T1 where the temporary holding unit 4 and the flange CO92 overlap with each other (in FIG. 7, the area T1 is emphasized by cross-hatching with lines slanted in a direction and lines slanted in another direction relative to the axial direction X and the width direction Y). Of the protector hole 43*b*, the first hole 43*b*1 has a length in the width direction Y that is larger than the length of the second hole 43*b*2 in the width direction Y (see FIG. 1). This structure restricts horizontal move of the connector CO9 (in the axial direction X and the width direction Y). With the temporary holding unit 4 temporarily holding the connector CO9, the gap between the outer peripheral surface of the first columnar portion CO94*a* and the inner peripheral surface of the first hole 43*b*1 is, for example, 0.5 to 0.75 mm, and the gap between the outer peripheral surface of the protector columnar portion 42*d* and the inner peripheral surface of the connector hole CO93*h* is, for example, 0.50 to 0.75 mm.

A device such as a rear motor is subsequently installed to the vehicle with the connector CO9 held by the temporary holding unit 4. Since the connector CO9 is temporarily held, the installation operation of the device is difficult to be interrupted by the connector CO9. During installation of the device to the vehicle, the device, a tool, the operator, or the like may accidentally touch the connector CO9. For this issue, the temporary holding unit 4 of the protector 1 includes the first holding part 42 and the second holding part 43 located remote from each other. In this structure, the protector 1 can keep the connector CO9 from being tilted relative to the temporary holding unit 4 and thus can make the temporary hold on the connector CO9 more stable. When the installation operation of the device to the vehicle is completed, the connector CO9 is moved in the removal direction Z2. Specifically, in the removal direction Z2, the connector CO9 is moved in the removal direction Z2 by a distance identical to the length L3, by which the protector columnar portion 42*d* projects from the first surface 42*f* in the removal direction Z2. This operation can remove the protector columnar portion 42d from the connector hole CO93h, and remove the second portion CO94, or the connector columnar portion, from the protector hole 43b. As described above, moving the connector CO9 in the removal direction Z2 disengages the first portion CO93 of the flange CO92 from the first holding part 42 and disengages the second portion CO94 of the flange CO92 from the second holding part 43. The connector CO9 temporarily held by the temporary holding unit 4 is accordingly released. The released connector CO9 is allowed to horizontally move. As the final step, the connector CO9 is connected to a rear motor, the target device. More specifically, the operation is completed by connecting the connector CO9 provided to an end of the wire member W with a counterpart connector of the previously installed target device (the rear motor (not illustrated) in this embodiment) with a bolt and a nut.

The above-described protector 1 is configured as described below. The temporary holding unit 4 includes the first holding part 42 engageable with the first portion CO93 of the flange CO92 of the connector CO9, and the second holding part 43 located remote from the first holding part 42 and engageable with the second portion CO94 of the flange CO92 of the connector CO9. The protector 1 according to the embodiment is allowed to temporarily hold the connector CO9 at the first holding part 42 and the second holding part 43 located remote from each other, thereby keeping the connector CO9 from being tilted relative to the temporary holding unit 4. The protector 1 according to the embodiment can therefore make temporary hold on the connector CO9 more stable. Furthermore, while the temporary holding unit 4 temporarily holds the connector CO9, the first holding part 42 and the second holding part 43 are located in the area T1 where the temporary holding unit 4 and the flange CO92 overlap with each other, when viewed from the insertion direction Z1. This configuration can reduce the size of the temporary holding unit 4 as much as possible, thereby achieving a size reduction of the protector 1 according to the embodiment.

The protector 1 is configured as below. The temporary holding unit 4 projecting outside the protector body 2 is integrally formed with the protector body 2. This configuration of the protector 1 according to the embodiment can omit the process to install the temporary holding unit 4 to the protector 1 and is therefore effective in reducing the production time for assembly.

Furthermore, the protector 1 is configured as below. The temporary holding unit 4 has the first surface 42f and the second surface 43f each intersecting with the insertion direction Z1. The first holding part 42 has the protector columnar portion 42d extending from the first surface 42f along the removal direction Z2, which is a direction opposite to the insertion direction Z1. The second holding part 43 has the protector hole 43b extending from the second surface 43f along the insertion direction Z1. The connector CO9 is moved in the insertion direction Z1 relative to the temporary holding unit 4, which allows the protector columnar portion 42d to be inserted in the connector hole CO93h, as a first portion, and the connector columnar portion, which is the second portion CO94, to be inserted in the protector hole 43b. This process allows the temporary holding unit 4 to temporarily hold the connector CO9. The protector 1 of the embodiment is configured in a fashion that avoids holes from being gathered in either the protector body 2 or the connector CO9, which is effective in protecting the temporary holding unit 4 and the connector CO9 from being less stiff.

Furthermore, the protector 1 is configured as below. The second surface 43f is located closer to the insertion direction Z1 relative to the first surface 42f. The front end surface CO94f of the connector columnar portion (the second portion CO94) is located closer to the insertion direction (Z1) relative to the first end surface CO92e1 of the flange CO92. This configuration of the protector 1 of the embodiment can reduce the distance the connector CO9 moves in the removal direction Z2 when the connector CO9 is released from temporary hold of the protector 1. The workability of the protector 1 of the embodiment is therefore increased when releasing the temporary hold.

Furthermore, the protector 1 is configured as below. The length L1 from the second surface 43f to the front end surface 42df of the protector columnar portion 42d in the removal direction Z2 is equal to the length L2 from the first end surface CO92e1 to the front end surface CO94f of the first columnar portion CO94a of the flange CO92 in the insertion direction Z1. This configuration of the protector 1 of the embodiment allows for simultaneous insertion of the protector columnar portion 42d into the connector hole CO93h and the connector columnar portion (the second portion CO94) into the protector hole 43b. In the action of temporary hold, the protector 1 of the embodiment allows both the columnar portions to be simultaneously inserted into the respective holes while avoiding only one of the columnar portions is inserted, which can avoid large force from being applied to either one of the columnar portions.

Furthermore, the protector 1 of the embodiment is configured as below. The connector hole CO93h, or the first portion CO93, of the connector CO9 is basically used for connection between the flange CO92 of the connector CO9 and the counterpart connector of a device. The protector 1 of the embodiment uses the connector hole CO93h for temporary hold and thus has no necessity of specially forming a hole for temporary hold, on the connector CO9. The configuration of the protector 1 of the embodiment therefore allows for a size reduction of the connector CO9.

Furthermore, the protector 1 of the embodiment is configured as below. For connection of the flange CO92 and the counterpart flange, a protruding portion of the above-described device is disposed in the inner peripheral surface of the cylindrical first columnar portion CO94a of the second portion CO94 of the connector CO9. The protector 1 of the embodiment uses the first columnar portion CO94a for temporary hold and thus has no necessity of specially forming a columnar portion for the temporary hold, on the connector CO9. The configuration of the protector 1 of the embodiment therefore allows for a size reduction of the connector CO9.

Furthermore, the protector 1 of the embodiment is configured as below. The protector hole 43b through which the connector columnar portion (the second portion CO94) is inserted is located between the connector body CO91 and the connector hole CO93h in the axial direction X. The protector 1 of the embodiment is allowed to effectively use the flange CO92 of the connector CO9, and thus can avoid an increase in the size of the flange CO92. The configuration of the protector 1 of the embodiment therefore allows for a size reduction of the connector CO9.

Furthermore, the protector 1 of the embodiment is configured as below. The temporary holding unit 4 has the holding-part side wall portion 42e that covers the outer peripheral surface of the protector columnar portion 42d in the width direction Y intersecting with the insertion direction Z1. With this configuration, in installing the protector 1 to the vehicle body BD, a foreign object is difficult to contact the protector columnar portion 42*d*.

In the above-described embodiment, the wire member W uses the electrical wire Wa. The present invention is not limited thereto, and the wire member W is allowed to use other members, such as a metal rod, a wire bundle, and a cable. A metal rod is formed with a conductive rod-shaped member exteriorly covered by an insulating covering member. A wire bundle is a plurality of electrical wires Wa tied in a bundle. A cable is formed with a covering member of the electrical wires Wa exteriorly covered by an insulating sheath.

A target device is installed to the vehicle body BD after installation of the protector 1 to the vehicle body BD. In this process, in the above-described embodiment, the temporary holding unit 4 can keep the device from contacting the connector CO9. The present invention is, however, not limited thereto. For example, the wire harness WH1 may be an assembly of a plurality of parts, and when the parts assembled in the wire harness WH1 are installed to the vehicle body BD after installation of the protector 1 to the vehicle body BD, the temporary holding unit 4 can keep the parts from contacting the connector CO9.

In the above-described embodiment, the temporary holding unit 4 is integrally formed with the protector body 2. The present invention is, however, not limited thereto, and the temporary holding unit 4 may be formed separately from the protector body 2.

In the above-described embodiment, the protector 1 has the protector body 2 and the lid member 3 separately formed. The present invention is, however, not limited thereto, and the protector body 2 and the lid member 3 may be integrally formed.

A temporary holding unit of a protector according to the present embodiment includes a first holding part engageable with a first portion of a flange of a connector and a second holding part located remote from the first holding part and engageable with a second portion of the flange of the connector. The protector according to the present embodiment is capable of temporarily holding the connector using the first holding part and the second holding part, which are located remote from each other. This structure is effective in preventing the connector from being tilted relative to the protector body. The protector according to the present embodiment is therefore allowed to make its temporary hold on the connector more stable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector, comprising:
   a protector body that holds a wire member; and
   a temporary holding unit that temporarily holds a connector provided to an end of the wire member, wherein
   the temporary holding unit includes a first holding part engageable with a first portion of a flange of the connector and a second holding part located remote from the first holding part and engageable with a second portion of the flange of the connector, and
   with the temporary holding unit temporarily holding the connector, the first holding part and the second holding part are located in an area in which the temporary holding unit and the flange overlap one over another, when viewed from an insertion direction, wherein the first holding part and the second holding part are structurally different elements.

2. The protector according to claim 1, wherein
   the protector body has a routing space inside the body in which the wire member is routed, and
   the temporary holding unit is integrally formed with the protector body in a manner projecting outside the protector body.

3. The protector according to claim 2, wherein
   the temporary holding unit has a first surface and a second surface intersecting with the insertion direction,
   the first holding part has a protector columnar portion extending from the first surface along a removal direction, the removal direction being a direction opposite to the insertion direction,
   the second holding part has a protector hole extending from the second surface along the insertion direction, and
   the temporary holding unit temporarily holds the connector by moving the connector in the insertion direction relative to the temporary holding unit, and causing the protector columnar portion to be inserted in a connector hole that is the first portion, and causing a connector columnar portion that is the second portion to be inserted in the protector hole.

4. The protector according to claim 3, wherein
   the second surface is located close to the insertion direction relative to the first surface,
   a front end surface of the connector columnar portion is located close to the insertion direction relative to an end surface of the flange, and
   with the connector temporarily held by the temporary holding unit, the end surface is in contact with the first surface in the insertion direction.

5. The protector according to claim 4, wherein
   a length from the second surface to a front end surface of the protector columnar portion in the removal direction is equal to a length from the end surface of the flange to a front end surface of the connector columnar portion in the insertion direction.

6. The protector according to claim 1, wherein
   the temporary holding unit has a first surface and a second surface intersecting with the insertion direction,
   the first holding part has a protector columnar portion extending from the first surface along a removal direction, the removal direction being a direction opposite to the insertion direction,
   the second holding part has a protector hole extending from the second surface along the insertion direction, and
   the temporary holding unit temporarily holds the connector by moving the connector in the insertion direction relative to the temporary holding unit, and causing the protector columnar portion to be inserted in a connector hole that is the first portion, and causing a connector columnar portion that is the second portion to be inserted in the protector hole.

7. The protector according to claim 6, wherein
   the second surface is located close to the insertion direction relative to the first surface,
   a front end surface of the connector columnar portion is located close to the insertion direction relative to an end surface of the flange, and
   with the connector temporarily held by the temporary holding unit, the end surface is in contact with the first surface in the insertion direction.

8. The protector according to claim 7, wherein
a length from the second surface to a front end surface of the protector columnar portion in the removal direction is equal to a length from the end surface of the flange to a front end surface of the connector columnar portion in the insertion direction.

\* \* \* \* \*